United States Patent
Badichi

(10) Patent No.: US 12,340,392 B2
(45) Date of Patent: Jun. 24, 2025

(54) AD FRAUD DETECTION SYSTEM AND METHOD

(71) Applicant: ANZU VIRTUAL REALITY LTD, Tel Aviv (IL)

(72) Inventor: Michael Badichi, Tel Aviv (IL)

(73) Assignee: ANZU VIRTUAL REALITY LTD, Tel Aviv (IL)

( * ) Notice: Subject to any disclaimer, the term of this patent is extended or adjusted under 35 U.S.C. 154(b) by 426 days.

(21) Appl. No.: 17/734,127

(22) Filed: May 2, 2022

(65) Prior Publication Data
US 2022/0374939 A1    Nov. 24, 2022

Related U.S. Application Data

(60) Provisional application No. 63/189,716, filed on May 18, 2021.

(51) Int. Cl.
*G06Q 30/0241*  (2023.01)
*A63F 13/61*  (2014.01)
*G06T 7/00*  (2017.01)
*G06T 7/90*  (2017.01)

(52) U.S. Cl.
CPC ......... *G06Q 30/0248* (2013.01); *A63F 13/61* (2014.09); *G06T 7/0002* (2013.01); *G06T 7/90* (2017.01); *G06T 2207/10016* (2013.01); *G06T 2207/10024* (2013.01)

(58) Field of Classification Search
CPC   G06Q 30/0248; G06Q 30/0272; A63F 13/61; G06T 7/0002; G06T 7/90; G06T 2207/10016; G06T 2207/10024
See application file for complete search history.

(56) References Cited

U.S. PATENT DOCUMENTS

| | | | |
|---|---|---|---|
| 9,342,740 B1 * | 5/2016 | Guo | G06V 30/413 |
| 9,865,005 B1 * | 1/2018 | Pottjegort | G06Q 30/0242 |
| 10,679,244 B1 * | 6/2020 | Bhowmick | G06Q 30/0248 |
| 10,699,295 B1 * | 6/2020 | Le Chevalier | G06Q 30/0248 |
| 10,783,548 B1 * | 9/2020 | Bhowmick | G06Q 30/0242 |
| 11,076,111 B1 * | 7/2021 | Ni | G06V 20/41 |
| 2006/0136294 A1 | 6/2006 | Linden | |
| 2008/0319774 A1 | 12/2008 | O'sullivan et al. | |
| 2008/0320125 A1 * | 12/2008 | O'Sullivan | G06Q 30/0241 709/224 |
| 2010/0299202 A1 * | 11/2010 | Li | G06Q 30/0251 705/14.49 |
| 2011/0161145 A1 * | 6/2011 | Mahajan | G06Q 30/02 705/14.4 |
| 2011/0231249 A1 | 9/2011 | Zuili | |
| 2015/0242178 A1 * | 8/2015 | Cho | G06F 3/1446 345/1.2 |

(Continued)

FOREIGN PATENT DOCUMENTS

WO    WO-2019142179 A1 *   7/2019  ............. A63F 13/46

*Primary Examiner* — Henok Shiferaw
*Assistant Examiner* — Woo C Rhim
(74) *Attorney, Agent, or Firm* — S.J. Intellectual Property LTD.

(57) ABSTRACT

The presently disclosed subject matter aims to provide a system and method for detecting potential ad frauds by determining color content resemblance of at least one pixel of an ad media displayed within at least one given placement on a plurality of user devices, and a desired color of the at least one pixel.

20 Claims, 9 Drawing Sheets

(56) References Cited

U.S. PATENT DOCUMENTS

| | | | |
|---|---|---|---|
| 2016/0171954 A1* | 6/2016 | Guo | G06F 18/24 |
| | | | 345/589 |
| 2016/0180410 A1 | 6/2016 | Agrawal | |
| 2016/0358226 A1* | 12/2016 | Chang | G06Q 30/0272 |
| 2018/0012378 A1* | 1/2018 | Khandpur | G06T 11/001 |
| 2018/0130092 A1* | 5/2018 | Nahass | A63F 13/49 |
| 2018/0315099 A1* | 11/2018 | Lorimor | G06Q 30/0242 |
| 2018/0374116 A1* | 12/2018 | van Datta | G06Q 30/0277 |
| 2019/0122258 A1* | 4/2019 | Bramberger | G06N 3/08 |
| 2019/0313152 A1 | 10/2019 | Liu | |
| 2020/0043041 A1* | 2/2020 | Shaw | G06Q 30/0248 |
| 2020/0360810 A1* | 11/2020 | Badichi | A63F 13/61 |
| 2022/0067415 A1* | 3/2022 | Kerofsky | G06Q 30/0248 |

\* cited by examiner

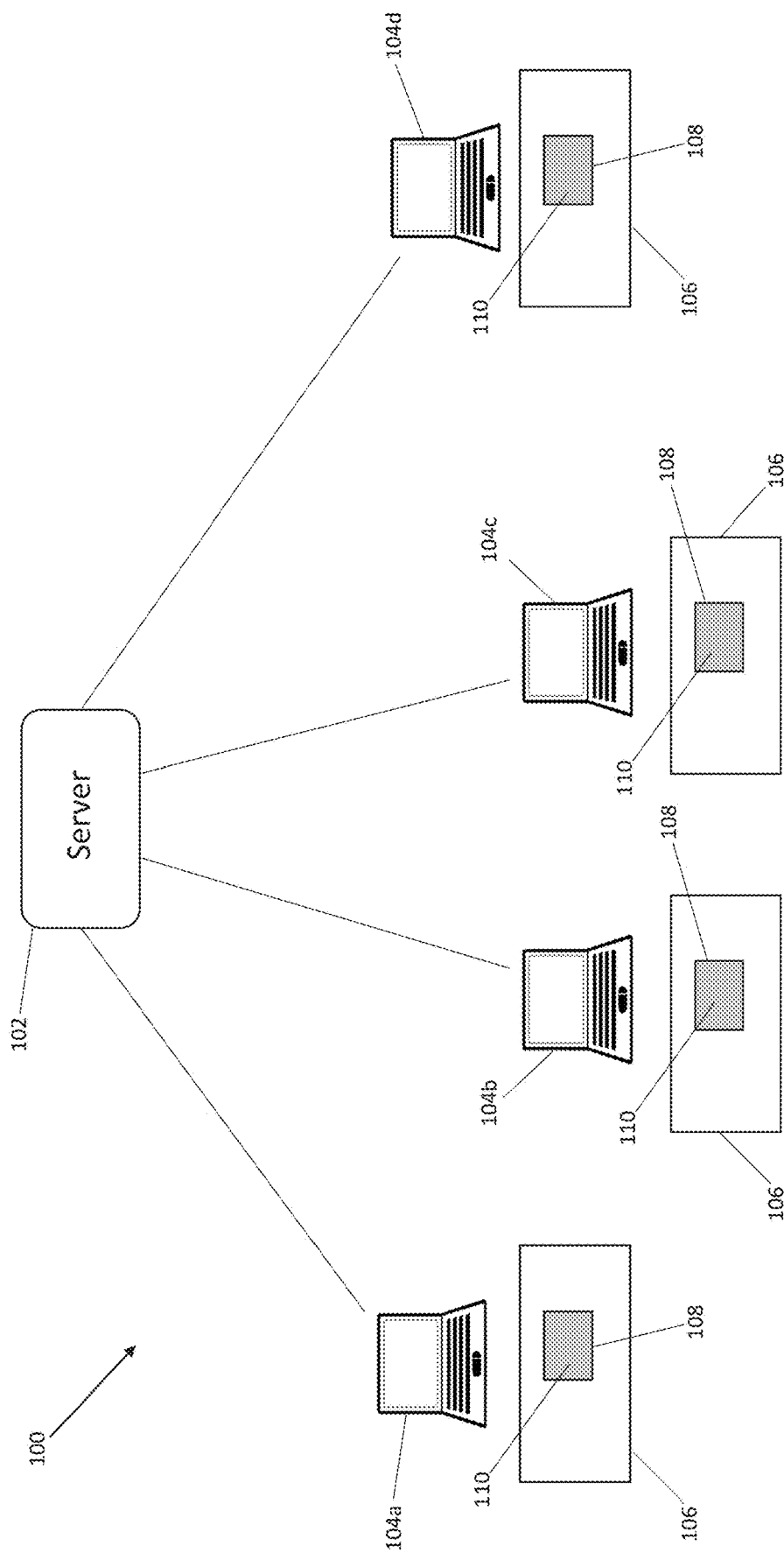

AD FRAUD DETECTION SYSTEM AND METHOD

TECHNICAL FIELD

The present invention relates to the field of systems and methods for detecting ad frauds.

BACKGROUND

In-game advertising, or IGA, involves advertising in computer and video games. This is generally made using advertising media (also known as ad media), such as pop-up messages, cut-scenes, on-screen adverts, billboards, and background displays. Virtual spaces are sold for advertising purposes to advertisers or content providers, much in the same way space is sold in the real world.

Content providers would like to ensure the viewability of their advertisements over time, ensuring that the content is viewable by the viewer for a certain time period. In addition, content providers would like to avoid potential ad frauds associated with fraudulent representation of online advertisement impressions, clicks, conversion, or data events.

Current solutions to avoid potential ad frauds are inadequate, as they rely on client-side verification of the ad media presented to the viewer. This verification is resource consuming and prone to work arounds or hacks bypassing the ad fraud detection mechanism.

There is thus a need in the art for a new ad fraud detection system and method.

GENERAL DESCRIPTION

In accordance with a first aspect of the presently disclosed subject matter, there is provided a system for determining color content resemblance of at least one pixel of an ad media displayed within at least one given placement on a plurality of user devices, the system comprising a processing circuitry configured to perform the following: obtain from at least some of the plurality of user devices a color of the at least one pixel such that each color of the at least one pixel is associated with a user device of the at least some of the plurality of user devices; calculate for each color of the at least one pixel a content resemblance score indicative of color resemblance between the color of the at least one pixel obtained from a respective user device and a desired color; calculate an average content resemblance score for the at least one pixel utilizing at least one content resemblance score of at least one color of the at least one pixel obtained from the respective user of the at least some of the plurality of user devices; and, determine whether the average content resemblance score is within a predefined threshold range.

In some cases, the at least one pixel is positioned within a segment of the ad media including a plurality of pixels, each having a homogenous dominant color that is within a predefined color threshold.

In some cases, the homogenous dominant color of each pixel of the plurality of pixels is associated with an Red Green Blue (RGB) value.

In some cases, the homogenous dominance of each color of each pixel of the plurality of pixels within the segment is determined by calculating an average Red Green Blue (RGB) value of the plurality of pixels within the segment and determining whether each RGB value of each pixel of the plurality of pixels in the segment is within a threshold distance from the average RGB value.

In some cases, the at least one pixel is positioned at the center of the segment of the ad media.

In some cases, the ad media is an image.

In some cases, the ad media is a video.

In some cases, the processing circuitry is configured to obtain a time frame of the video associated with a plurality of images assembling the video within the time frame, each image of the plurality of images contains the at least one pixel positioned within a segment of the ad media including a plurality of pixels, each having a homogenous dominant color.

In some cases, the processing circuitry is configured to select a single time point within the time frame and obtain the color of the at least one pixel from the image associated with the time point so as to calculate a content resemblance score for the at least one pixel.

In some cases, the single time point is the midpoint of the time frame of the video.

In some cases, the color of the at least one pixel is associated with an Red Green Blue (RGB) value.

In some cases, the color of the desired color is associated with an Red Green Blue (RGB) value.

In some cases, the placement has a multi-dimensional configuration.

In some cases, the multi-dimensional configuration is a 2D configuration.

In some cases, the multi-dimensional configuration is a 3D configuration.

In some cases, the system is directed to determine an ad fraud whenever the average content resemblance score of the at least one pixel is outside the predefined threshold range.

In some cases, the placement has a dynamic layout.

In some cases, the color of the at least one pixel obtained from the at least some of the plurality of user devices is obtained at predetermined time periods.

In some cases, the color of the at least one pixel is obtained from all of the plurality of user devices.

In some cases, the calculations are performed on a server which receives the color of the at least one pixel from the at least some of the plurality of user devices.

In accordance with a second aspect of the presently disclosed subject matter, there is provided a method for determining color content resemblance of at least one pixel of an ad media displayed within at least one given placement on a plurality of user devices, the method comprising: obtaining from at least some of the plurality of user devices a color of the at least one pixel such that each color of the at least one pixel is associated with a user device of the at least some of the plurality of user devices; calculating for each color of the at least one pixel a content resemblance score indicative of color resemblance between the color of the at least one pixel obtained from a respective user device and a desired color; calculating an average content resemblance score for the at least one pixel utilizing at least one content resemblance score of at least one color of the at least one pixel obtained from the respective user of the at least some of the plurality of user devices; and, determining whether the average content resemblance score is within a predefined threshold range.

In some cases, the at least one pixel is positioned within a segment of the ad media including a plurality of pixels, each having a homogenous dominant color that is within a predefined color threshold.

In some cases, the homogenous dominant color of each pixel of the plurality of pixels is associated with an Red Green Blue (RGB) value.

In some cases, the homogenous dominance of each color of each pixel of the plurality of pixels within the segment is determined by calculating an average Red Green Blue (RGB) value of the plurality of pixels within the segment and determining whether each RGB value of each pixel of the plurality of pixels in the segment is within a threshold distance from the average RGB value.

In some cases, the at least one pixel is positioned at the center of the segment of the ad media.

In some cases, the ad media is an image.

In some cases, the ad media is a video.

In some cases, the method further comprising: obtaining a time frame of the video associated with a plurality of images assembling the video within the time frame, each image of the plurality of images contains the at least one pixel positioned within a segment of the ad media including a plurality of pixels, each having a homogenous dominant color.

In some cases, the method further comprising: selecting a single time point within the time frame and obtain the color of the at least one pixel from the image associated with the time point so as to calculate a content resemblance score for the at least one pixel.

In some cases, the single time point is the midpoint of the time frame of the video.

In some cases, the color of the at least one pixel is associated with an Red Green Blue (RGB) value.

In some cases, the color of the desired color is associated with an Red Green Blue (RGB) value.

In some cases, the placement has a multi-dimensional configuration.

In some cases, the multi-dimensional configuration is a 2D configuration.

In some cases, the multi-dimensional configuration is a 3D configuration.

In some cases, the method is directed to determine an ad fraud whenever the average content resemblance score of the at least one pixel is outside the predefined threshold range.

In some cases, the placement has a dynamic layout.

In some cases, the color of the at least one pixel obtained from the at least some of the plurality of user devices is obtained at predetermined time periods.

In some cases, the color of the at least one pixel is obtained from all of the plurality of user devices.

In some cases, the calculations are performed on a server which receives the color of the at least one pixel from the at least some of the plurality of user devices.

In accordance with a third aspect of the presently disclosed subject matter, there is provided a non-transitory computer readable storage medium having computer readable program code embodied therewith, the computer readable program code, executable by at least one processor to perform a method for determining color content resemblance of at least one pixel of an ad media displayed within at least one given placement on a plurality of user devices, the determining color content resemblance comprising one or more components, the method comprising: obtaining from at least some of the plurality of user devices a color of the at least one pixel such that each color of the at least one pixel is associated with a user device of the at least some of the plurality of user devices; calculating for each color of the at least one pixel a content resemblance score indicative of color resemblance between the color of the at least one pixel obtained from a respective user device and a desired color; calculating an average content resemblance score for the at least one pixel utilizing at least one content resemblance score of at least one color of the at least one pixel obtained from the respective user of the at least some of the plurality of user devices; and, determining whether the average content resemblance score is within a predefined threshold range.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIGS. 1A-1C are schematic illustrations of an ad fraud detection system and its operation, in accordance with the presently disclosed subject matter;

DETAILED DESCRIPTION

Figure 1A:
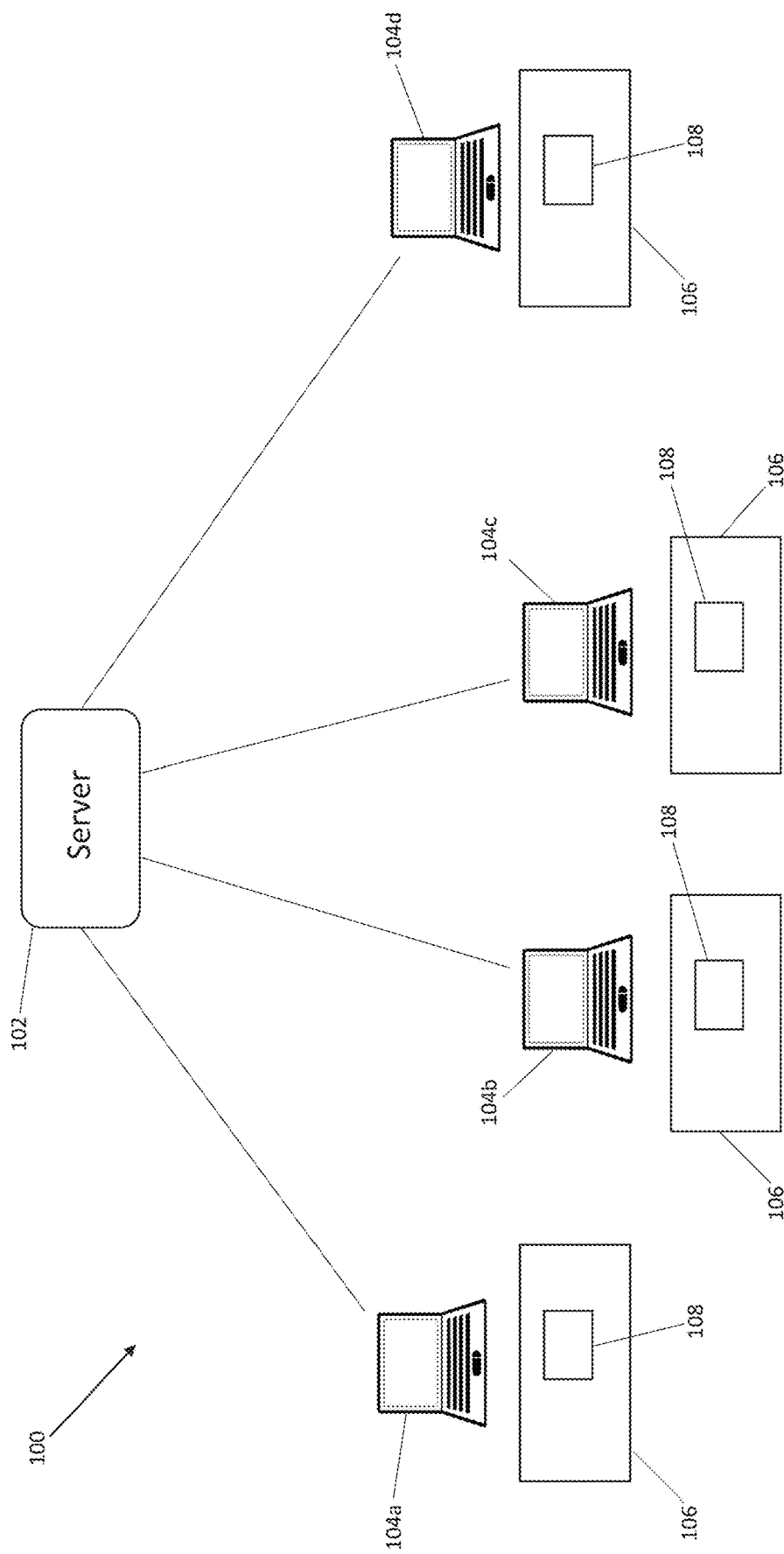

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "calculating", "determining", "selecting" or the like, include action and/or processes of a computer that manipulate and/or transform data into other data, said data represented as physical quantities, e.g., such as electronic quantities, and/or said data representing the physical objects. The terms "computer", "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 4:
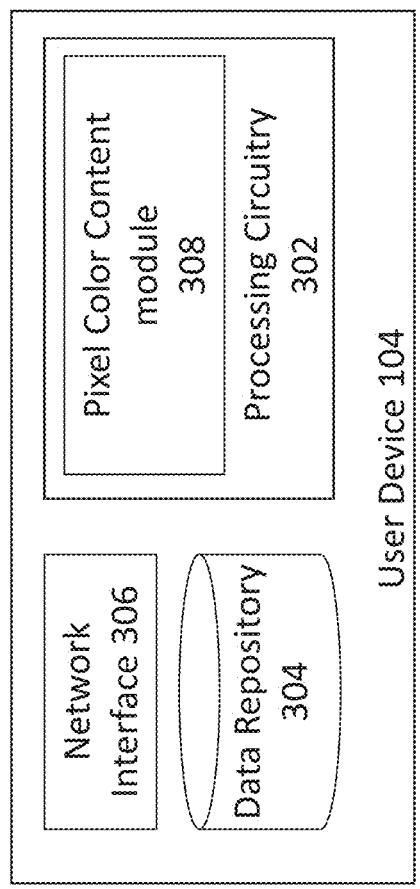
FIG. 4 is a block diagram schematically illustrating one example of a user device of an ad fraud detection system, in accordance with the presently disclosed subject matter.
Figure 5:
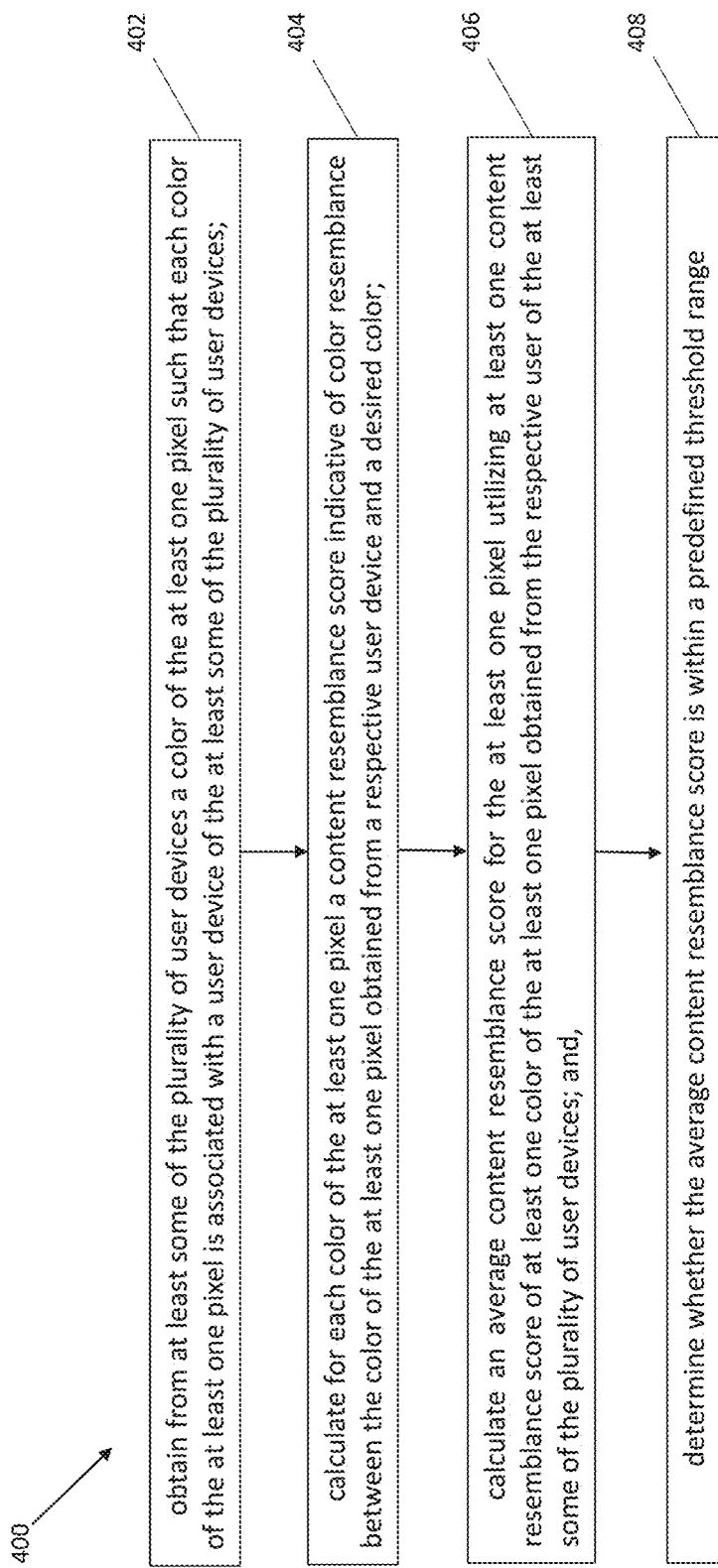
FIG. 5 is a flowchart illustrating one example of a sequence of operations carried out by an ad fraud detection system, in accordance with the presently disclosed subject matter; and, FIG. 6 is a schematic illustration of one example of an operation of the ad fraud detection system associated with the selection of at least one pixel of an ad media and the obtaining of its color, in accordance with the presently disclosed subject matter.

In embodiments of the presently disclosed subject matter, fewer, more and/or different stages than those shown in FIG. 5 may be executed. In embodiments of the presently disclosed subject matter one or more stages illustrated in FIG. 5 may be executed in a different order and/or one or more groups of stages may be executed simultaneously. FIGS. 1A-1C, 3-4, and 6 illustrate a general schematic of the system architecture in accordance with an embodiment of the presently disclosed subject matter. Each module in FIGS. 3 and 4 can be made up of any combination of software, hardware and/or firmware that performs the functions as defined and explained herein. The modules in FIGS. 3 and 4 may be centralized in one location or dispersed over more than one location. In other embodiments of the presently disclosed subject matter, the system may comprise fewer, more, and/or different modules than those shown in FIGS. 3 and 4.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIGS. 1A and 1C, showing a schematic illustration of an ad fraud detection system (also interchangeably referred to herein as "system") and its operation, in accordance with the presently disclosed subject matter.

As shown in the schematic illustration, system 100 includes a server 102 in communication with one or more user devices, for example, user devices 104a-104d. Each of user devices 104a-104d, which can be, for example, any one of a laptop computer, a desktop computer, a tablet computer, a smartphone, a gaming console, and the like, is capable of running an application 106, e.g., a gaming application. Application 106 includes one or more placements, for example, placement 108, which are defined spaces within the application environment capable of receiving and displaying an ad media. The ad media can be, for example, an image or a video having a two-dimensional configuration.

Placement 108 can have a dynamic layout and various shapes, such as rectangular, square, triangle, round, and the like. In addition, placement 108 can have a multi-dimensional configuration, e.g., a two-dimensional or a three-dimensional configuration.

In order for placement 108 to display an ad media, for example, ad media 110 (FIG. 1B), a request to receive an ad media fitted to be displayed within placement 108 is sent from one or more of user devices 104a-104d to server 102. In response to the request, server 102 obtains ad media 110 (e.g., by retrieving a suitable ad media from a data repository thereof) and sends it to the requesting one or more user devices of user devices 104a-104d. Once at the requesting one or more user devices, ad media 110 is placed within placement 108 such that the ad can be viewed by users of the requesting one or more user devices of user devices 104a-104d whenever the environment of application 106 containing placement 108 is presented to them (FIG. 1C).

Figure 2:
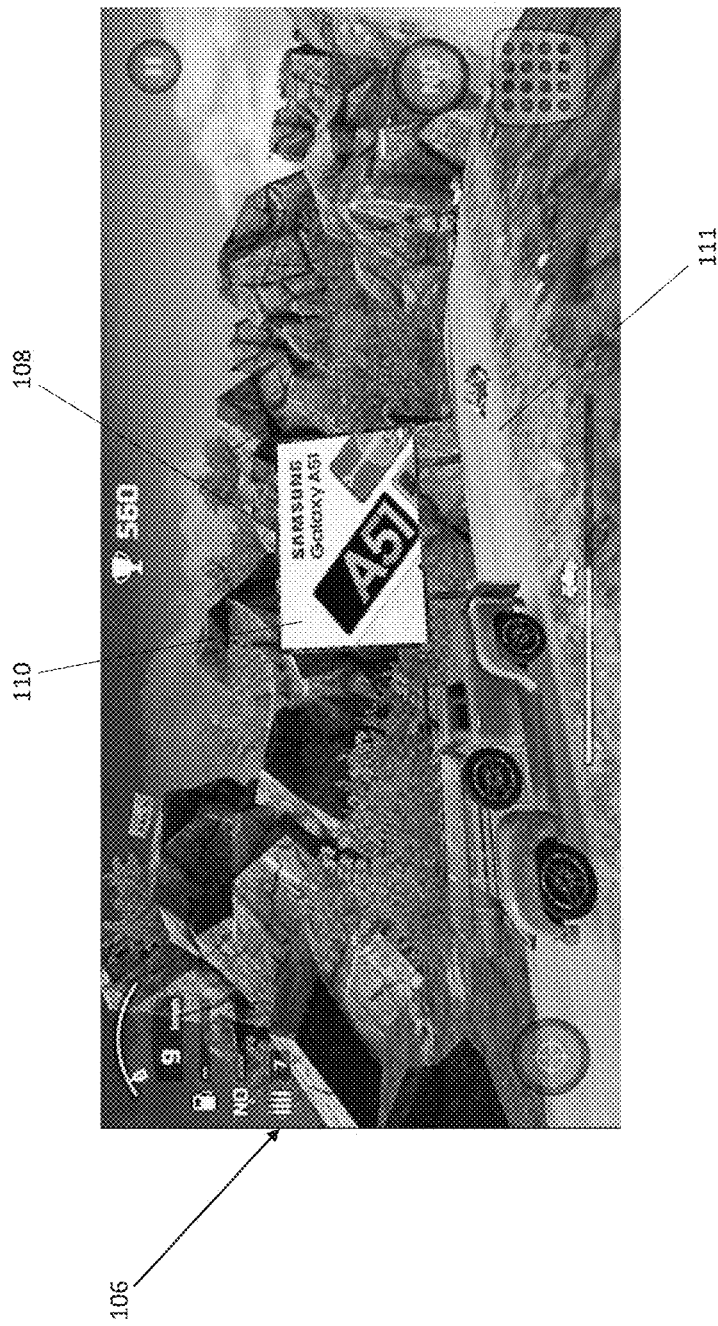
FIG. 2 is an illustration of one example of an operation of an ad fraud detection system, in accordance with the presently disclosed subject matter.

By way of example, user devices 104a-104d are gaming consoles displaying a three-dimensional car racing gaming application 106 (best seen in FIG. 2). The car racing gaming application 106 includes a square-shaped placement 108 located at the side of a segment of a race track 111 on which the contestants are competing to reach the finish line first. Following a request sent from user devices 104a-104d to server 102 to receive an ad media to be displayed within square-shaped placement 108, a two-dimensional ad media 110 consisting of an image of a new smartphone is provided to each of the requesting user devices 104a-104d. As users using user devices 104a-104b reach, via their car gaming character, the segment of the race track 111 on which the square-shaped placement 108 is located, they are exposed to the two-dimensional ad media 110, and by that to the image of the new smartphone, for at least the time they are at the segment of the race track 111.

It is to be noted that although the shape of placement 108 can alter from its original shape, depending on changes in the point of view of the user within application 106, system 100 is able to address the shape of the placement according to its original shape using any technological solution known in the art.

As ad media 110 is being displayed within one or more given placements (e.g., placement 108) located on one or more user devices of user devices 104a-104d, system 100 evaluates these placements in search of potential ad fraud, as further detailed herein, inter alia, with reference to FIG. 5.

Attention is now drawn to the components of the server 102.

Figure 3:
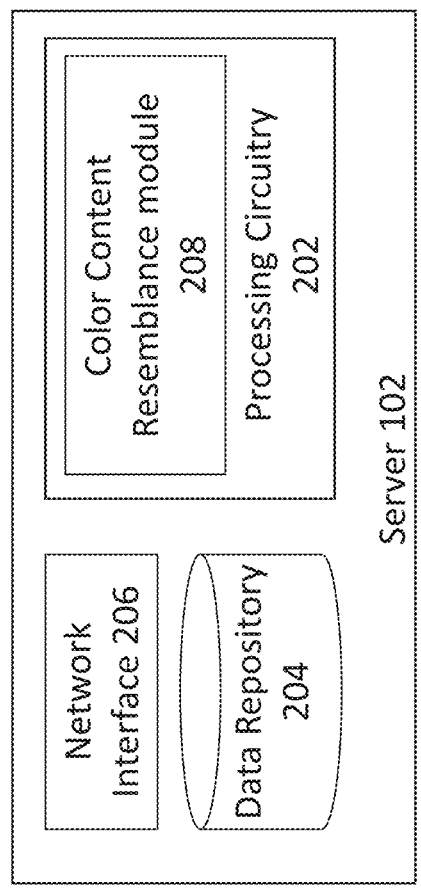
FIG. 3 is a block diagram schematically illustrating one example of a server of an ad fraud detection system, in accordance with the presently disclosed subject matter.

FIG. 3 is a block diagram schematically illustrating one example of the server 102, in accordance with the presently disclosed subject matter.

In accordance with the presently disclosed subject matter, server 102 can comprise a network interface 206. The network interface 206 (e.g., a network card, a Wi-Fi client, a LiFi client, 3G/4G client, or any other component), enables server 102 to communicate over a network with external systems and handles inbound and outbound communications from such systems. For example, server 102 can receive, through network interface 206, a request from one or more user devices to provide an ad media to be placed within placements dispersed within an application run on the one or more user devices.

Server 102 can further comprise or be otherwise associated with a data repository 204 (e.g., a database, a storage system, a memory including Read Only Memory—ROM, Random Access Memory—RAM, or any other type of memory, etc.) configured to store data, optionally including, inter alia, ad media, pixels coordinates (explained below), pixels color, content resemblance scores, average content resemblance scores, etc. Data repository 204 can be further configured to enable retrieval and/or update and/or deletion of the stored data. It is to be noted that in some cases, data repository 204 can be distributed, while the server 102 has access to the information stored thereon, e.g., via a wired or wireless network to which server 102 is able to connect (utilizing its network interface 206).

Server 102 further comprises processing circuitry 202. Processing circuitry 202 can be one or more processing units (e.g., central processing units), microprocessors, microcontrollers (e.g., microcontroller units (MCUs)) or any other computing devices or modules, including multiple and/or parallel and/or distributed processing units, which are adapted to independently or cooperatively process data for controlling relevant server 102 resources and for enabling operations related to server's 102 resources.

The processing circuitry 202 comprises a color content resemblance module 208, configured to perform an ad fraud detection process, as further detailed herein, inter alia with reference to FIG. 5.

FIG. 4 is a block diagram schematically illustrating one example of the user device 104, in accordance with the presently disclosed subject matter.

In accordance with the presently disclosed subject matter, user device 104 can comprise a network interface 306. The network interface 306 (e.g., a network card, a Wi-Fi client, a LiFi client, 3G/4G client, or any other component), enables user device 104 to communicate over a network with external systems and handles inbound and outbound communications from such systems. For example, user device 104 can receive, through network interface 306, an ad media to be placed within placements dispersed within an application run on the user device.

User device 104 can further comprise or be otherwise associated with a data repository 304 (e.g., a database, a storage system, a memory including Read Only Memory—ROM, Random Access Memory—RAM, or any other type of memory, etc.) configured to store data, optionally including, inter alia, ad media, pixels coordinates (explained below), pixels colors, content resemblance scores, etc. Data repository 304 can be further configured to enable retrieval and/or update and/or deletion of the stored data. It is to be noted that in some cases, data repository 304 can be distributed, while the user device 104 has access to the information stored thereon, e.g., via a wired or wireless network to which user device 104 is able to connect (utilizing its network interface 306).

User device 104 further comprises processing circuitry 302. Processing circuitry 302 can be one or more processing units (e.g., central processing units), microprocessors, microcontrollers (e.g., microcontroller units (MCUs)) or any other computing devices or modules, including multiple and/or parallel and/or distributed processing units, which are adapted to independently or cooperatively process data for controlling relevant user device 104 resources and for enabling operations related to user device's 104 resources.

The processing circuitry 302 comprises a pixel color content module 308, configured to provide the color of a given pixel as part of an ad fraud detection process, as further detailed herein, inter alia with reference to FIG. 5.

Turning to FIG. 5, there is shown a flowchart illustrating one example of a sequence of operations carried out for detecting ad fraud, in accordance with the presently disclosed subject matter.

Accordingly, the ad fraud detection system can be configured to perform an ad fraud detection process 400, e.g., using color content resemblance module 208 and pixel color content module 308.

For this purpose, ad fraud detection system 100 conducts a color content resemblance determination process on at least one pixel of ad media 110, displayed within one or more placements 108 of one or more of user devices 104a-104d.

Figure 1B:
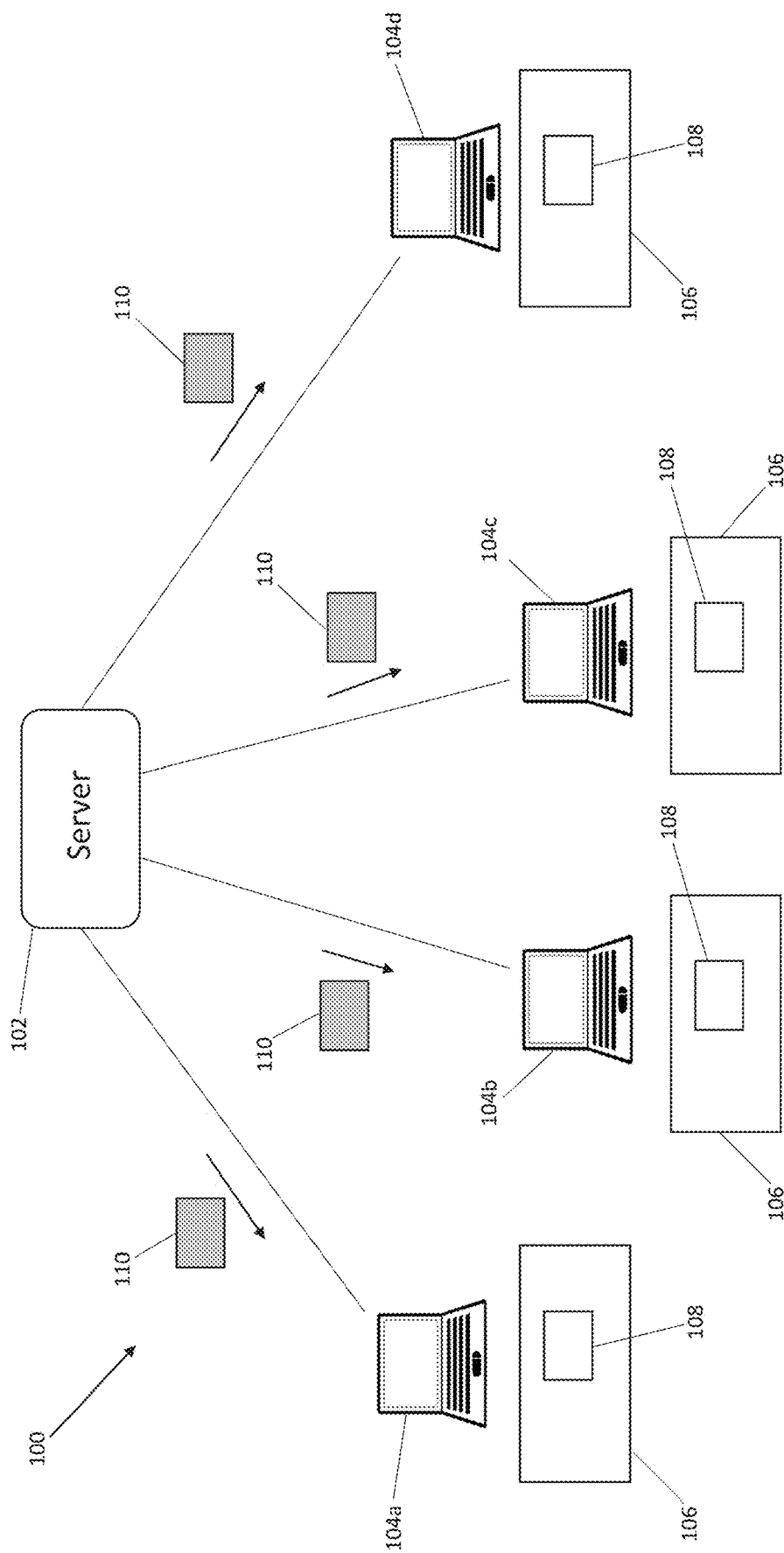

In accordance with and following the description above with reference to FIGS. 1A-1C, system 100, through server 102, obtains from one or more of user devices 104a-104d, displaying ad media 110 within placement 108, a color of at least one pixel of ad media 110 such that each color of the at least one pixel is associated with a corresponding user device of the one or more of user devices 104a-104d (block 402). The colors of the at least one pixel, each associated, for example, with an Red Green Blue (RGB) value, are provided from the corresponding user device of the one or more user devices 104a-104d, through their pixel color content module 308.

Figure 6:
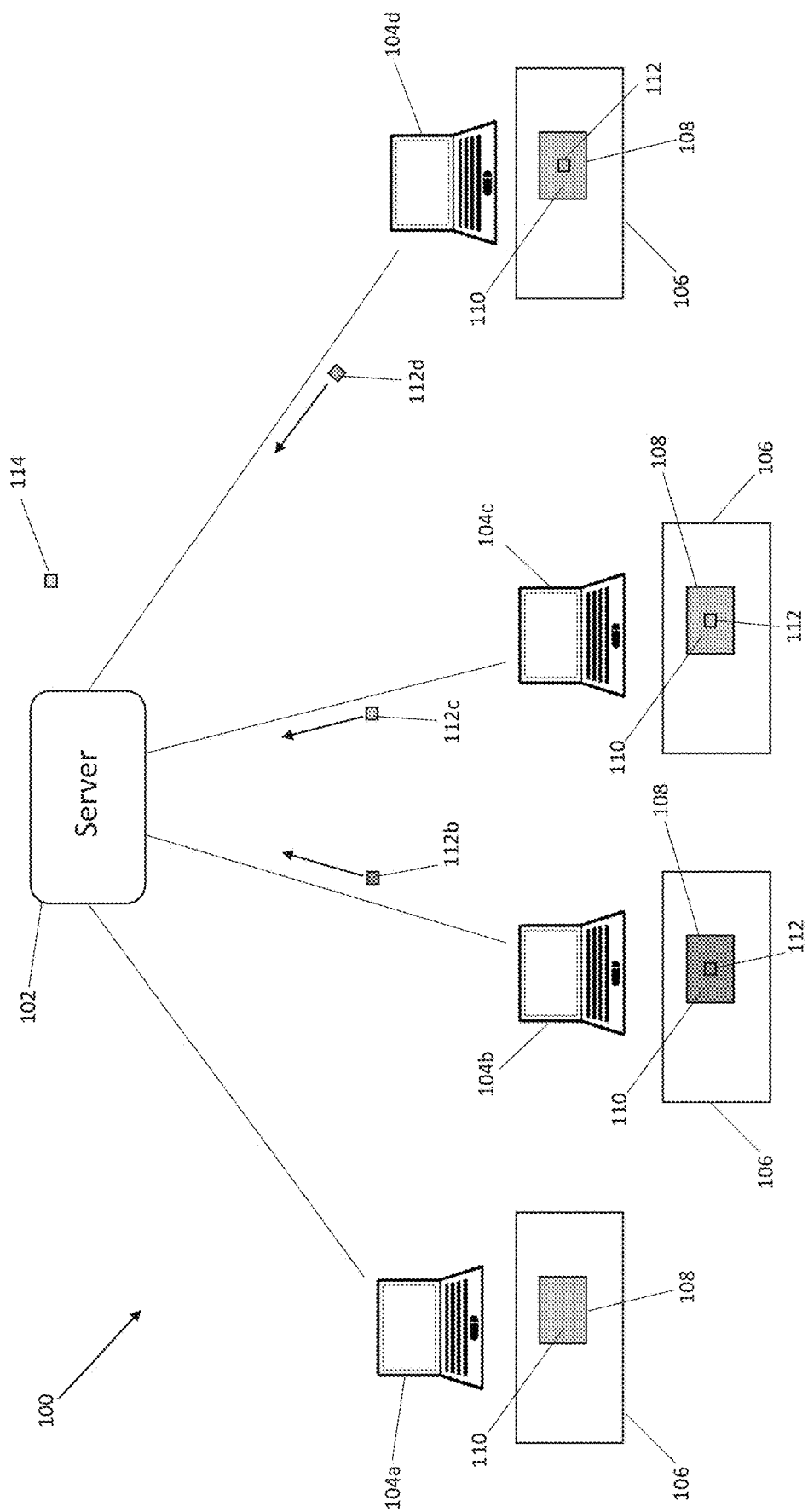

The selection of the at least one pixel and the obtaining of its color may be achieved by utilizing one or more methods and/or techniques. One such method is detailed herein and illustrated in FIG. 6. FIG. 6 is an illustration schematically illustrating one example of ad media 110, displayed within placement 108, being evaluated by ad fraud detection system 100 so as to determine a content resemblance score for a given at least one pixel, in accordance with the presently disclosed subject matter.

In the non-limiting method of FIG. 6, further to the sending of ad media 110 to the one or more requesting user devices of user devices 104a-104d, as detailed above in relation to FIG. 1B, server 102 sends identification details associated with at least one desired pixel along with a request to the one or more requesting user devices of user devices 104a-104d to return the color of the at least one desired pixel, as it is displayed within placement 108. The identification details can be, for example, coordinates associated with the location of the at least one desired pixel, a segment of the ad media in which the at least one desired pixel is located, and the like.

In response to the request from server 102, the one or more requesting user devices of user devices 104a-104d provide server 102 with the actual color of the at least one desired pixel at the time of the request.

In some cases, server 102 can send one or more requests for obtaining the color of the at least one desired pixel at predetermined time periods. In other cases, the location of the desired pixel can change between subsequent requests to prevent bypassing of the ad fraud detection.

By way of example, illustrated in FIG. 6, server 102 sends a request to user devices 104b, 104c and 104d to provide the color of pixel 112, positioned at the center of ad media 110 presented within placement 108. The request is accompanied with coordinates associated with the location of pixel 112.

In response to the request from server 102, each of user devices 104b, 104c and 104d sends server 102 the color of pixel 112, denoted 112b, 112c, and 112d, respectively. In the example illustrated in FIG. 6, the color of pixel 112 of user devices 104c and 104d is grey, while the color of pixel 112 of user device 104b is dark grey.

In some cases, the coordinates associated with the location of the at least one desired pixel and/or the axes dimensions of the given placement presenting the given ad media can be normalized so as to bring them to be within the same value range. For example, in cases where a specific ad media is presented in a 1000×1000 size format within a placement located on one user device and in a 500×500 size format within a placement located on another user device, there is a need to normalize the dimensions of the placements so as to be within the same value range. Furthermore, in these cases the values of any coordinates associated with the location of at least one desired pixel should also be normalized so as to be able to address the same pixel of the ad media within each of the placements.

Figure 7B:
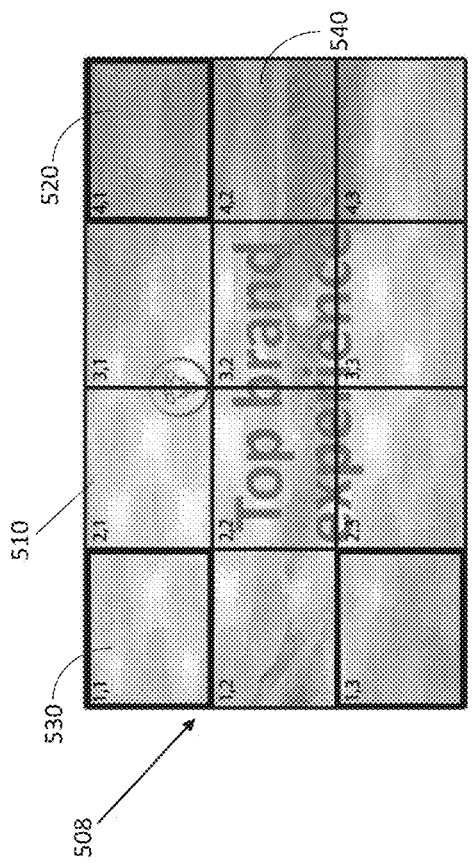
FIGS. 7A and 7B are schematic illustrations of another example of an operation of the ad fraud detection system associated with the selection of at least one pixel of an ad media and the obtaining of its color, in accordance with the presently disclosed subject matter.
Figure 7A:
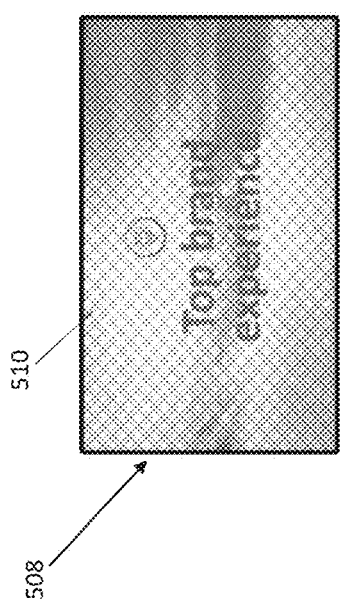

Another method, alternatively or additionally to the method illustrated in FIG. 6, for the selection of the at least one pixel and the obtaining of its color is detailed herein and illustrated in FIGS. 7A and 7B. FIGS. 7A and 7B are illustrations schematically illustrating another example of an ad media 510, displayed within a placement 508, being evaluated by ad fraud detection system 100 so as to determine a content resemblance score for at least one pixel, in accordance with the presently disclosed subject matter.

The non-limiting method of FIGS. 7A and 7B illustrate an ad media 510 with its actual colors as they are viewed by users of the one or more user devices of user devices 104a-104d (FIG. 7A). The method involves, for example, dividing the ad media 510 into several segments, and from these segments, identifying one or more segments of ad media 510 having homogenous dominant color (FIG. 7B). By way of example, ad media 510 is divided into twelve equal segments, including, for example, segments 520, 530, and 540, such that each of the twelve segments is assembled of a plurality of pixels. Each pixel of the plurality of pixels assembling the twelve segments is associated with an Red Green Blue (RGB) value that is, for example, within a predefined color threshold that can be, e.g., a range of Red Green Blue (RGB) values.

In order to identify a segment of ad media 510 as having homogenous dominant color, the method determines, for example, whether the color of each of the plurality of pixels assembling the given segment of ad media 510 is considered to be a homogenous dominant color. This is made, for example, by calculating an average Red Green Blue (RGB) value for the plurality of pixels within the given segment and determining whether each Red Green Blue (RGB) value of each pixel of the plurality of pixels in the given segment is within a threshold distance from the average Red Green Blue (RGB) value. If the Red Green Blue (RGB) value of each pixel of the plurality of pixels in the given segment is within the threshold distance from the average Red Green Blue (RGB) value, the segment is classified as having homogenous dominant color. In such a case, the one or more user devices of user devices 104a-104d provide server 102 with the color of at least one pixel of the plurality of pixels assembling the segment. In our continuing example, segment 530 is identified as a segment with homogenous dominant color, as all the pixels assembling this segment are within the gray color spectrum of the visible light, as well as, within a threshold distance from the average grey color value of the plurality of pixels. In accordance with that, the one or more user devices of user devices 104a-104d provide server 102 with the color of the pixel positioned, for example, at the center of segment 530.

It should be noted that the methods disclosed in relation to FIGS. 6 and 7A-7B are mere examples of two methods of selection of at least one pixel of an ad media and obtaining of its color, and other methods and or techniques may be used, mutatis mutandis. It is also to be noted that wherever Red Green Blue (RGB) is referred, any other color encoding scheme may be used, including, for example, Hue, Saturation, Brightness (HSB), YUV (luminance, chroma, violet), or any other color encoding scheme.

In some cases, ad media 110 can be a video formed of one or more images. In these cases, server 102 obtains a time frame of the video associated with a plurality of images assembling the video within that time frame. Each image of the plurality of images contains at least one common pixel positioned within a segment of the ad media including a plurality of pixels, such that each pixel of the plurality of pixels has a homogenous dominant color. The system 100 then selects a single time point within the time frame, for example, the midpoint of the time frame of the video, and obtains the color of the at least one common pixel from the image associated with the time point so as to calculate a content resemblance score for the at least one common pixel. In a non-limiting example, ad media 110 is a ten seconds video consisting of 10 images. System 100 obtains from the ten seconds video a time frame of six seconds, starting at the fourth second and ending at the tenth second, containing a common pixel at the middle of the images surrounded by a plurality of pixels having homogenous dominant colors. System 100 then selects the image associated with the seventh second of the time frame, and obtains the color of the common pixel from this image.

Once server 102 receives the colors of the at least one desired pixel from the one or more user devices of user devices 104a-104d, it calculates for each color of the at least one pixel a content resemblance score indicative of color resemblance between the color of the at least one pixel obtained from a respective user device of user devices 104a-104d, and a desired color. The calculation is made, for example, by comparing the Red Green Blue (RGB) values of the desired color and the at least one pixel obtained from the respective user device of user devices 104a-104d (block 404). Returning to the example illustrated in FIG. 6, server 102 calculates for each color of pixel 112 (112b, 112c, and 112d) a content resemblance score by comparing the Red Green Blue (RGB) value of each of colors 112b, 112c, and 112d to the Red Green Blue (RGB) value of a desired color 114, which is light grey.

After the calculation of the content resemblance score for each color of the at least one pixel, system 100 calculates an average content resemblance score for the at least one pixel utilizing at least one content resemblance score of at least one color of the at least one pixel obtained from one or more respective user devices of the user devices 104a-104d (block 406). In our continuing example of FIG. 6, system 100 calculates an average content resemblance score for pixel 112 using the content resemblance scores of colors 112b, 112c, and 112d.

System 100 then determines whether the average content resemblance score is within a predefined threshold range (block 408). In cases where the average content resemblance score is outside the predefined threshold range, system 100 notifies the user that a potential ad fraud has been detected. In our continuing example of FIG. 6, system 100 determines that since the average content resemblance score for pixel 112 is not within a predefine threshold range a potential fraud has occurred. Given that, system 100 sends a notification to the system's user that a potential fraud has been detected.

It is to be noted, with reference to FIG. 5, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

What is claimed is:

1. A system for determining color content resemblance of at least one pixel of an ad media displayed within at least one given placement on a plurality of user devices, the system comprising a processing circuitry configured to perform the following:
    obtain from two or more of the plurality of user devices a color of the at least one pixel such that each color of the at least one pixel is associated with a user device of the two or more of the plurality of user devices;
    calculate, for each obtained color, a content resemblance score indicative of color resemblance between the obtained color and a desired color;
    based on the content resemblance scores associated with the obtained colors, calculate an average content resemblance score for the at least one pixel; and,
    determine whether the average content resemblance score is within a predefined threshold range.

2. The system of claim 1, wherein the at least one pixel is positioned within a segment of the ad media including a plurality of pixels, each having a homogenous dominant color that is within a predefined color threshold.

3. The system of claim 2, wherein the homogenous dominant color of each color of each pixel of the plurality of pixels within the segment is determined by calculating an average Red Green Blue (RGB) value of the plurality of pixels within the segment and determining whether each RGB value of each pixel of the plurality of pixels in the segment is within a threshold distance from the average RGB value.

4. The system of claim 2, wherein the at least one pixel is positioned at the center of the segment of the ad media.

5. The system of claim 1, wherein the ad media is an image or a video.

6. The system of claim 5, wherein the processing circuitry is configured to obtain a time frame of the video associated with a plurality of images assembling the video within the time frame, each image of the plurality of images contains the at least one pixel positioned within a segment of the ad media including a plurality of pixels, each having a homogenous dominant color.

7. The system of claim 6, wherein the processing circuitry is configured to select a single time point within the time frame and obtain the color of said at least one pixel from the image associated with said time point so as to calculate a content resemblance score for the at least one pixel.

8. The system of claim 7, wherein the single time point is the midpoint of the time frame of the video.

9. The system of claim 1, wherein the system is directed to determine an ad fraud whenever the average content resemblance score of the at least one pixel is outside the predefined threshold range.

10. The system of claim 1, wherein the calculations are performed on a server which receives the color of the at least one pixel from the two or more of the plurality of user devices.

11. A method for determining color content resemblance of at least one pixel of an ad media displayed within at least one given placement on a plurality of user devices, the method comprising:
    obtaining from two or more of the plurality of user devices a color of the at least one pixel such that each color of the at least one pixel is associated with a user device of the two or more of the plurality of user devices;
    calculating, for each obtained color, a content resemblance score indicative of color resemblance between the obtained color and a desired color;
    based on the content resemblance scores associated with the obtained colors, calculating an average content resemblance score for the at least one pixel; and,
    determining whether the average content resemblance score is within a predefined threshold range.

12. The method of claim 11, wherein the at least one pixel is positioned within a segment of the ad media including a plurality of pixels, each having a homogenous dominant color that is within a predefined color threshold.

13. The method of claim 12, wherein the homogenous dominant color of each color of each pixel of the plurality of pixels within the segment is determined by calculating an average Red Green Blue (RGB) value of the plurality of pixels within the segment and determining whether each RGB value of each pixel of the plurality of pixels in the segment is within a threshold distance from the average RGB value.

14. The method of claim 12, wherein the at least one pixel is positioned at the center of the segment of the ad media.

15. The method of claim 11, wherein the ad media is an image or a video.

16. The method of claim 15 further comprising: obtaining a time frame of the video associated with a plurality of images assembling the video within the time frame, each image of the plurality of images contains the at least one pixel positioned within a segment of the ad media including a plurality of pixels, each having a homogenous dominant color.

17. The method of claim 16, further comprising: selecting a single time point within the time frame and obtain the color of said at least one pixel from the image associated with said time point so as to calculate a content resemblance score for the at least one pixel.

18. The method of claim 17, wherein the single time point is the midpoint of the time frame of the video.

19. The method of claim 11, wherein the calculations are performed on a server which receives the color of the at least one pixel from the two or more of the plurality of user devices.

20. A non-transitory computer readable storage medium having computer readable program code embodied therewith, the computer readable program code, executable by at least one processor to perform a method for determining color content resemblance of at least one pixel of an ad media displayed within at least one given placement on a plurality of user devices, the determining color content resemblance comprising one or more components, the method comprising:
- obtaining from two or more of the plurality of user devices a color of the at least one pixel such that each color of the at least one pixel is associated with a user device of the two or more of the plurality of user devices;
- calculating, for each obtained color, a content resemblance score indicative of color resemblance between the obtained color and a desired color;
- based on the content resemblance scores associated with the obtained colors, calculating an average content resemblance score for the at least one pixel; and,
- determining whether the average content resemblance score is within a predefined threshold range.

* * * * *